Inventor
Theron T. Collins, Jr.
by Parker & Carter
Attorneys

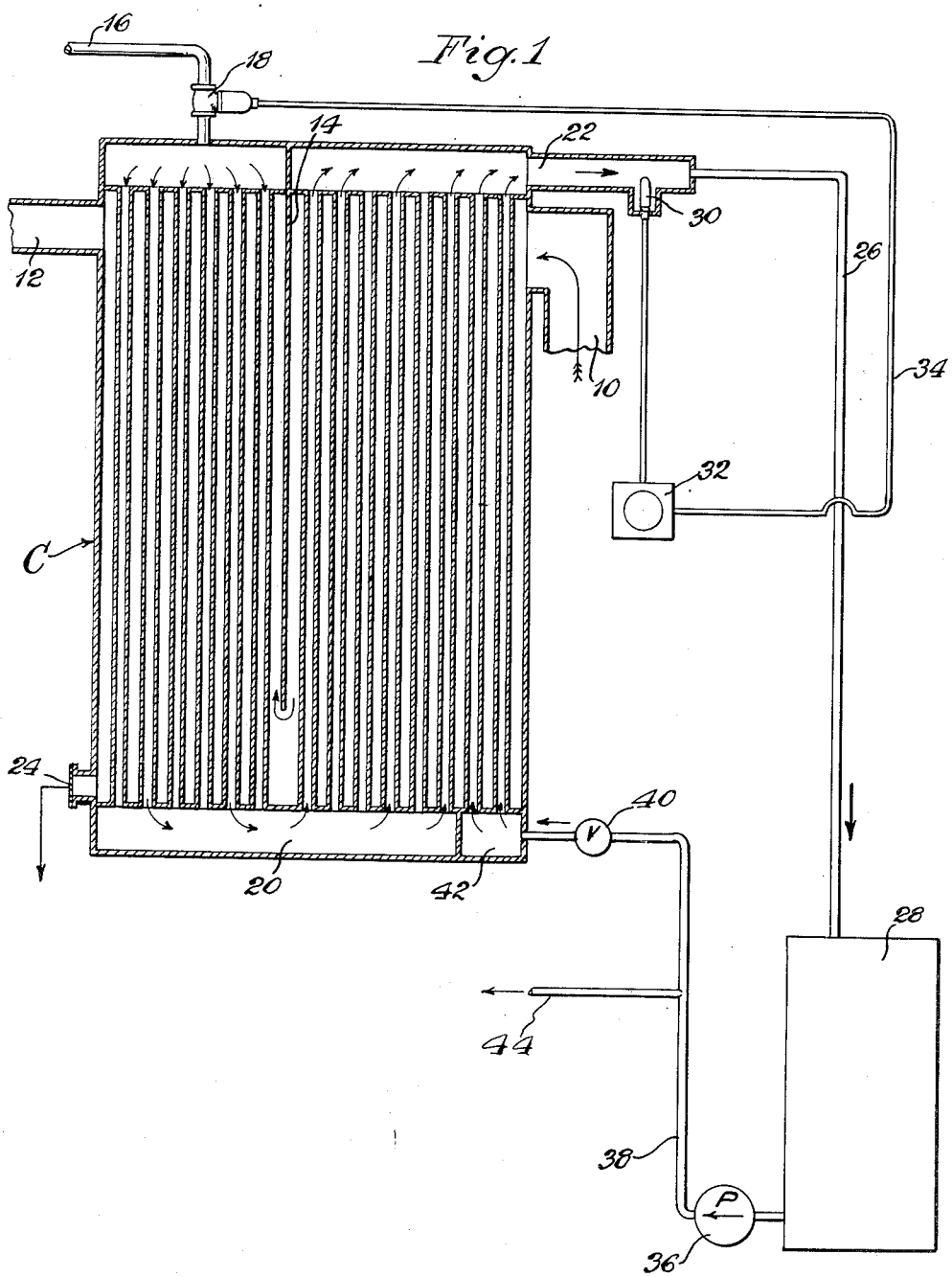

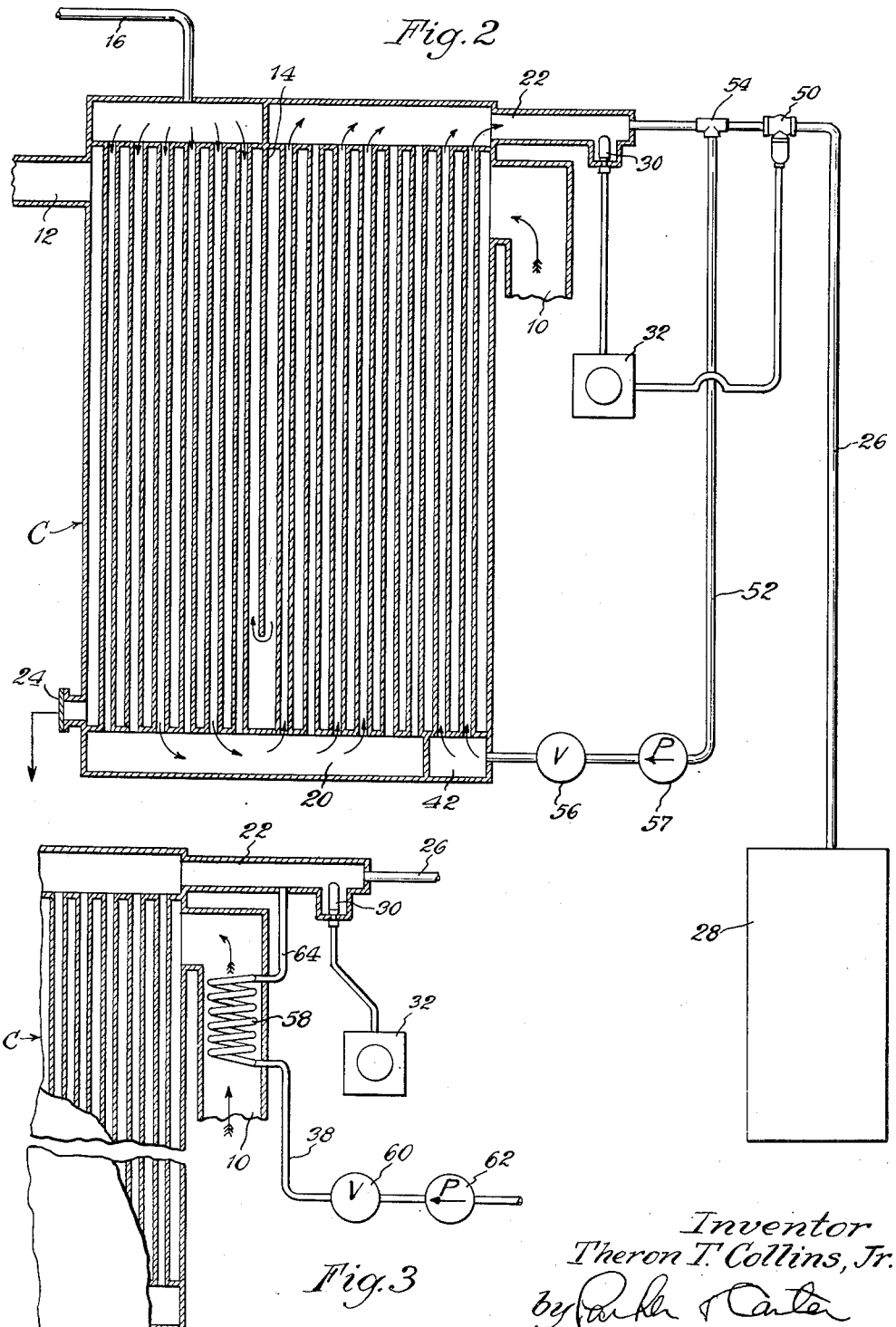

United States Patent Office 2,776,092
Patented Jan. 1, 1957

2,776,092

CONTROL METHOD AND APPARATUS FOR HEAT RECOVERY CONDENSERS

Theron T. Collins, Jr., Appleton, Wis.

Application March 5, 1953, Serial No. 340,446

14 Claims. (Cl. 236—18)

My invention resides in the field of condensers or heat exchangers and is a method and apparatus for controlling the same and has for a primary object a new and improved method for accurately controlling a condenser so as to acquire improved performance and a substantial gain in the quantity of heat recovered thereby.

Another object of my invention is a new and improved control apparatus for a condenser adapted to accurately regulate the quantity of water flowing through the condenser to a hot water storage tank in relation to the temperature of the steam or vapor passing through the condenser.

Other objects will appear from time to time in the ensuing specification and drawings, in which:

Figure 1 is a schematic or diagrammatic view partly in section, of a conventional heat exchanger or surface condenser with my new and improved control system attached thereto;

Figure 2 is a modification, partly in section, of the structure shown in Figure 1;

Figure 3 is a modification, partly in section, which can be applied to the structure of either Figure 1 or Figure 2;

Figure 4:
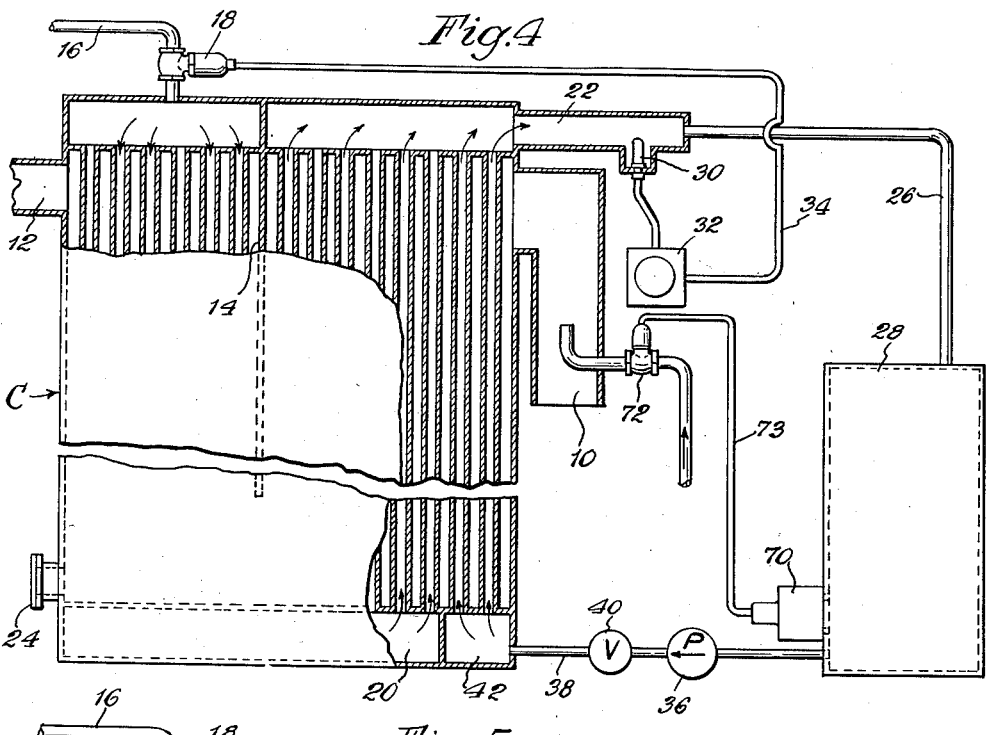
Figure 4 is a modification, partly in section, of the structure shown in Figure 1.

Surface condensers are used to recover heat from the exhaust of numerous industrial processes, the condenser being disposed on the exhaust line of the process. The make-up or feed water heated by the condenser is fed to a hot water storage tank preparatory to its use in the particular industrial process. A large number of the industrial processes operate according to a cycle that might be described as periodic, consequently the make-up feed water moving through the condenser to the hot water storage tank will have to be controlled or regulated so that it will only flow during the period when steam or hot vapor gases are being emitted from the process. The period during which steam or vapor is being exhausted through the condenser is commercially referred to as a blow period, and during a non-blow period it is necessary to shut off the cold make-up water moving through the condenser and prevent any cold water from being pumped into the hot water storage tank. Various systems have been used for accurately controlling the cold make-up water, but all of them suffer from a common defect, namely the lag between the beginning of a blow period and the time when sufficient cold water is being circulated through the condenser to completely condense all gas or vapor on the gas outlet side of the condenser. A reduction in this time lag is always desirable.

In Figure 1 a conventional surface condenser is illustrated at C and is provided with a gas, vapor or steam inlet at 10 and an outlet vent at 12. The steam or hot vapor from a commercial process enters the condenser at 10 at the upper right and moves downwardly around the conventional baffle structure indicated generally at 14 and then upwardly on the left side to the outlet vent at 12. It will be understood that I have shown in the drawings a very simple condenser with only a single baffle at 14. However, this is simply diagrammatic and any conventional baffling and redirecting internal structure for the vapor or steam could be used without departing from the inventive concept.

Cold water is brought into the system through an appropriate lead at 16 and passes through a control valve 18 to the upper left side of the condenser. From its inlet the cold make-up water passes downwardly through the internal heat exchange structure of the condenser to a lower sump or chamber, as at 20, and then upwardly along the right side to a hot water discharge port, as at 22. As illustrated, the condenser C has only two passes, namely, one on the left and one on the right. However, it will be understood that a large number of varying sizes of passes could be used and the inventive concept would remain the same and I have reduced the drawings to their simplest form to aid in a clear understanding of the invention. At the lower left-hand side of the condenser a discharge port 24 may be provided so that condensate from the vapor side of the condenser can be removed from the system.

By an appropriate connection 26, after the water is heated during its passage through the condenser it is taken from the discharge port 22 and conveyed to a hot water storage tank, at 28. From this storage tank, as it is needed, hot water may be introduced into appropriate locations in the industrial process, but as this feature forms no part of the present invention it has not been illustrated nor will it be described.

The commercial process to which the condenser is connected will discharge steam or hot vapor to the condenser at steady, variable, or intermittent flow. During these periods it is necessary that a proper amount of cold water from the inlet pipe 16 be admitted to and through the system, and it is necessary to operate the control valve 18 from completely closed position through a throttling range to completely open position. This regulation is necessary to prevent the admission of cold water to the line 26 and into the hot water storage tank. Accordingly, a control thermometer bulb 30 is located adjacent the discharge port of the condenser and in the water flow so that the temperature of the water moving from the condenser to the hot water storage tank can be accurately measured. A temperature controller and recorder 32 is connected to the thermometer bulb 30 so that the temperatures of the water can, at all times, be recorded as well as used to control various aspects of the system. A lead 34, running from the controller 32, is connected to the valve 18 so as to control the same. It will be understood that the valve 18 can be a throttling valve so that in response to the temperature at the thermometer 30 the valve can be set in any one of an indefinite number of positions by the temperature controller 32.

It is generally desirable to have the hot water in the storage tank at a predetermined minimum temperature within a given range, this temperature being governed by the type of industrial process to which the hot water is to be supplied. To acquire a certain predetermined minimum temperature in the storage tank it is generally necessary that the average temperature of the water coming through the discharge port 22, passing the thermometer bulb, be at least the predetermined minimum temperature or higher. An exception to this would occur if, during the blow period, the amount of steam or hot vapor released into the condenser were more than sufficient to heat the full flow of water passing through the condenser to a higher temperature than that desired for the water in the tank. In this case, the controller temperature setting could be set lower than the minimum storage tank water temperature desired, and the controller would automatically, over the period between blows, admit enough cold water to the condenser to cool the storage tank water to the desired temperature. Nevertheless, the controller 32 will be set so as to control the cold water passing through line 16 past the throttling valve 18, in accordance with the temperature of the water desired in the storage tank.

Assuming that the industrial process is passing into a nonblow period so that steam or hot vapor ceases to enter the condenser, the water leaving the condenser at the discharge port 22 will fall below the temperature value required to give the desired water temperature in the storage tank. In response to the controller, the throttling valve 18 will shut off the supply of cold water admitted to the condenser. As soon as a blow period occurs, during which hot vapor or steam will be admitted from the process into the condenser, the water in the condenser will be heated until the temperature of the water at the thermometer 30 reaches the temperature set on the controller, and the controller 32 will open the throttling valve 18 thus admitting cold water to the system and forcing hot water through the discharge port 22 and line 26 into the storage tank.

However, the reaction of such a unit during this phase is very slow because the water has not been flowing through the condenser and practically all of the water in the condenser has to be raised to the desired outlet temperature or above before the thermometer bulb 30 notifies the controller 32 to actuate the cold water make-up valve 18. The result is that the absorption of heat by the steam or vapor passing from the inlet vent 10 to the outlet vent 12 of the condenser will not be condensed when it leaves the system through the vent 12. It will be understood that under the optimum operating conditions the steam or vapor should be completely condensed when it reaches the outlet vent 12. I have found that under conventional operating conditions with standard units it takes approximately 95 seconds after the beginning of a blow period for the steam or vapor being emitted at the outlet vent 12 to become completely condensed, and during this 95 second period a great deal of useful heat is being lost through the discharge port.

To combat and obviate this lag period, I have conceived the idea of redirecting a certain amount of the hot water from the storage tank back through the last few passes, the last complete pass, or the last portion of the last pass of the condenser. In Figure 1, a pump 36 in a line 38 forces hot water from the storage tank through an adjustable valve 40 to a chamber 42 in the lower righthand side of the condenser C. The line 38 may be provided with a line 44 which leads off to the process or hot water can be taken directly from the tank 28. From the chamber 42 the hot water will move through the last few passes, the last pass, or the last portion of a pass of the condenser to the discharge port 22 and past the thermometer bulb 30. I have shown this arrangement only diagrammatically and it should be understood that any suitable structure can be installed in the condenser C so that the hot water being fed back through the line 38 and chamber 42 will pass through the last complete pass or any portion of that pass, depending upon how much hot water is found desirable to act as a pilot for control of the condenser. By this system the temperature of the water moving through the discharge port past the thermometer bulb 30 is approximately the same, or slightly below the temperature of the water in the storage tank. It will be understood that the valve 40 is open continuously and is only used to regulate the amount of hot water recirculated through the last portion of the condenser on a long-term basis. The pump 36 operates continuously so that the hot water passing through the line 38, the valve 40, chamber 42, the last pass or portion of the last pass to the discharge port 22, past the thermometer bulb 30, and through line 26 back to the storage tank 28, is a continuous recirculation process and does not depend upon whether or not hot vapor or steam is passing through the condenser. By the use of this recirculating pilot water feature, the temperature of the water at the thermometer bulb 30 is substantially always very close to the temperature necessary to actuate the controller 32, and, accordingly, during the initial portion of a blow period the water passing through port 22 has only a few degrees to rise before it will actuate the controller. Consequently, the lag period is greatly reduced in that the actuation of the cold water valve 18 by the controller 32 follows very closely on the heels of the beginning of a blow period. In a comparable setup to that during which the lag period was 95 seconds, as previously mentioned hereinabove, I have found that by using this pilot water recirculation feature the lag period can be reduced to approximately 35 seconds, depending upon the velocity of circulation of the pilot water in the last pass of the condenser. During the blow period, much closer regulation of water flow through the condenser, as well as better temperature regulation, is obtained. Therefore, it should be understood that if the hot water recirculated through the line 38 is allowed to pass through only a few of the tubes of the last pass at the optimum velocity for heat transfer, the reaction of the control system will be very sensitive and the temperature can be readily controlled within reasonably narrow limits.

Another important feature of my invention, which serves to obviate a decided disadvantage in prior condenser arrangements, is the stability of the system. Under the old system the controller had a tendency to hunt and halt the water flow through the valve 18 several times during a blow period for a few seconds so that vapor was lost through the outlet vent 12 to a considerable extent. Under the present system, using the hot water recirculation feature, the controller does not have this tendency at all, and once the throttling valve 18 has been actuated by the controller 32, a close check is performed and the amount of water being admitted to the condenser through the valve 18 is directly proportional to the temperature of the water passing the thermometer bulb 30.

The mixing of the water moving through the condenser with the pilot hot water occurs at the water outlet 22 of the condenser immediately ahead of the thermometer bulb so that the response of the controller 32 is directly dependent upon the water temperature resulting from the mixing at that point rather than upon some earlier event in the unit, such as an increase or a decrease in the water temperature further back in the condenser. This reduces the time lag and also the amplitude of the throttling of the control as well as the consequent temperature variations of the outlet water. When the condenser is standing full of cold water and hot water is circulating through the pilot system, the release of vapor into the condenser has to raise the temperature of the hot pilot water only a few degrees to start the make-up valve 18 opening and reduces to a negligible degree the time lag before cold water starts flowing into the condenser.

The pilot system of control that I have invented is also quite efficient when small quantities of vapor enter the condenser between blow periods since none of the pilot water is sewered and is normally not cooled unless desired. When it is desired to assure that the main body of the condenser stands full of cold water at the beginning of a blow period, it is merely necessary to set the temperature controller at a slightly lower temperature than that of the hot pilot water entering the condenser and by proper regulation the pilot water will automatically mix with enough water from the main body of the condenser to draw through the condenser any warm water heated at the end of the previous blow period and normally replace it with cold water.

In Figure 2 I have shown a modification of the invention in which the condenser C is substantially the same but the control valve on the cold water inlet has been replaced by a hot water control valve 50 inserted in the hot water connection 26 leading to the hot water storage tank 28. Thus the flow of water through the condenser is now controlled by a valve on the hot water discharged from the condenser instead of a valve on the cold water inlet to the condenser. The temperature controller and recorder 32 is the same and has its thermometer bulb 30 positioned in the hot water outlet so that the control or throttling valve 50 will be opened and closed according to the temperature of the water at the hot water outlet. It should be understood that the controller and recorder 32 is set so as to admit water of a predetermined minimum temperature into the hot water storage tank 28. With this structure it should be noted that the condenser C will stand under pressure, which was not the case in Figure 1, and in certain industrial processes it is desirable to have this particular situation.

In addition, in Figure 2, I have shown a hot water recirculating lead or connection 52 which is connected at 54 to the hot water lead 26 adjacent the hot water outlet 22. This lead 52 is provided with a valve 56 and a pump 57 so that hot water withdrawn from the hot water outlet can be regulated and recirculated through the last pass or the last portion of a pass in the condenser. By way of comparison to the structure of Figure 1 the hot water being circulated through the last pass or the last portion of a pass is not withdrawn, in Figure 2, from the hot water storage tank, but is taken directly out of the line adjacent the hot water outlet. Thus the hot water storage tank is eliminated from the hot water pilot path. Under the arrangement of Figure 2 the total amount of pilot water being circulated by the pump 57 will be far smaller than that involved when the full tank of hot water is in the pilot system, as shown in Figure 1. I have found that the arrangement of Figure 2 affords a far more sensitive control than the arrangement for Figure 1 for the temperature of all the water heated and passed into the storage tank because the pilot system does not include a large tank of hot water and the pilot system is not influenced by whatever may happen to the temperature of the water in the storage tank but is affected only by the heat exchange in the condenser. In Figure 2, as soon as the pilot water is withdrawn from the hot water outlet it is immediately forced back into the last portion of the condenser by the pump 57, thus producing more accurate and even control. Under certain circumstances such a system is far more desirable.

It should be understood that the use of the control valve 50 with the recorder and controller 32 on the hot water outlet as shown in Figure 2 is not necessarily restricted to the smaller pilot system as shown in Figure 2, but could be used effectively with the larger system shown in Figure 1. Similarly the use of the smaller pilot system shown in Figure 2 is not necessarily restricted to a hot water outlet control valve such as in Figure 2 but could be used with the cold water inlet control valve, such as at 18 in Figure 1.

I have shown another modification in Figure 3 in which the hot water being circulated through the last portion of the condenser, such as through leads 26 and 38 in Figure 1 and lead 52 in Figure 2, has been removed from the last portion of the condenser and has now been sent through a separate coil 58 positioned in the hot gases or vapor inlet 10. As in the two prior modifications a valve 60 and pump 62 are used to regulate, control and force the hot water through the auxiliary coil 58 and an appropriate lead 64 carries the hot water from the coil 58 to the hot water outlet 22. Thus, instead of the hot pilot water in the recirculatory system being sent into the last portion of the condenser, it is now circulated through the auxiliary coil 58 where it is heated by the hot gases or vapors entering the condenser through the inlet 10 and then taken by lead 64 to the hot water outlet 22. Note that the lead 64 is connected to the outlet ahead of the thermometer bulb 30 so that the heat carried thereby will affect the bulb.

It should be noted that the auxiliary coil or manifold 58 shown in Figure 3 could be used with the pilot water system of either Figures 1 or 2, and for this reason in Figure 3 I have not shown the details of either system. In addition, the Figure 3 structure is not restricted to a specific location of the main control valve, such as valve 18 in Figure 1 or valve 50 in Figure 2, thus either could be used with the Figure 3 structure.

If the structure of Figure 3, including the auxiliary coil 58, is used with the basic structure of Figure 1, to thus include the inlet control valve 18 with leads 26 and 38 for the pilot hot water system, its function and operation would be basically the same except during a nonblow period of the process which would be approximately as follows: The water in the hot water tank would be heated initially and if it became too hot so as to exceed the desired temperature, the circulating pilot water through the auxiliary coil 58 and lead 64 would heat the control bulb 32 and cause the valve 18 in Figure 1 to open during a nonblow period, thus letting cold water into the system. This cold water would be circulated through the system to the pilot control water and would be introduced into the hot water storage tank. As this water is cold, it would lower the temperature of the water in the storage tank and when that temperature reached the desired temperature, the pilot water would also be at that temperature and the valve 18 would close, thus shutting off the cold water. It should be noted that this operation would take place only during a nonblow period of the commercial process. It should also be noted that this particular operation would not take place if the coil 58 were used in the modification of Figure 2 as the pilot water therein is not circulated through the hot water tank.

In Figure 4 I have shown a modified system whereby the condenser can be used as an auxiliary heater to make more hot water than can be produced by the hot gases or vapors. A level control 70 is positioned adjacent the bottom of the tank 28 and is connected to a steam valve 72 by an appropriate lead 73, the steam valve being positioned in the hot vapor inlet 10 to the condenser and being adapted to admit steam from any available source into the condenser when the hot water in the storage tank reaches a predetermined low level. If the hot vapors or gases from the commercial process are insufficient to produce sufficient hot water, steam admitted through valve 72 will augment the hot vapors and heat water in the condenser at a rate sufficient to maintain the level of water in the storage tank until the next blow period.

Figure 5:
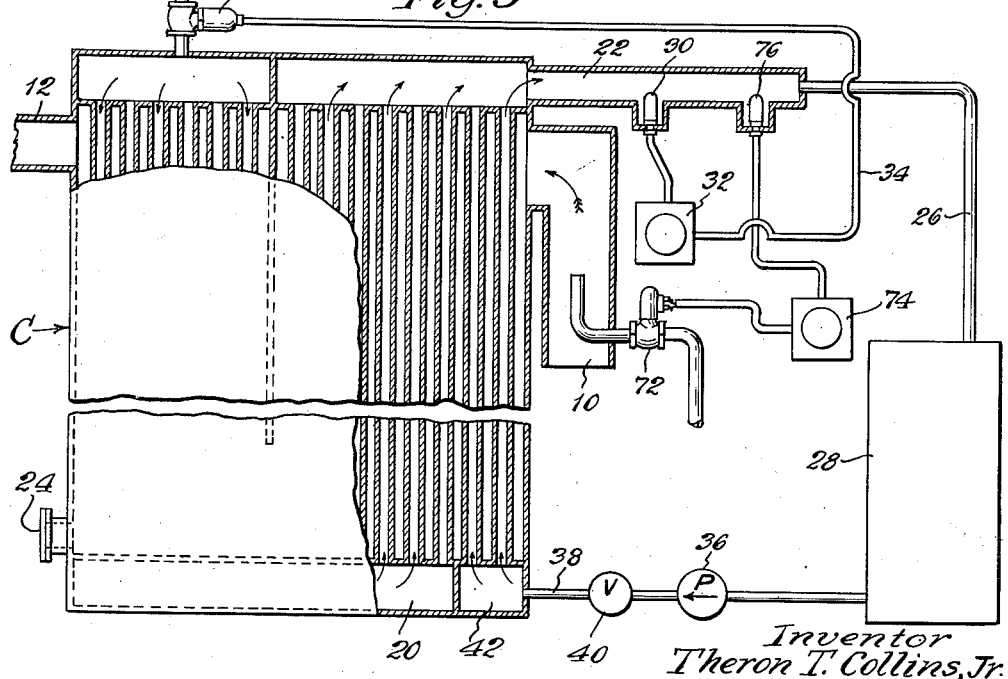
Figure 5 is a modification of the structure shown in Figure 4.

In Figure 5 I have shown other modifications, this being a variation of the Figure 4 structure. In this figure the auxiliary steam valve 72 is controlled by a recorder and controller 74 which has a thermometer bulb 76 positioned in the hot water outlet 22 of the condenser. By setting the controller 74 for a temperature above the temperature of the pilot water leaving the condenser, steam would be released into the condenser inlet 10 which would raise the pilot water temperature. The raised pilot water temperature would then actuate the main water flow controller 32 opening valve 18 and admitting cold water to the condenser. By balancing the relative temperature settings of the two controllers 74 and 32, a definite quantity of water could be heated.

Even though I have shown the level control 70 and steam valve 72 in Figure 4 with the larger pilot water system of Figure 1, it should be understood that the structure of this modification can be used with the smaller pilot water system of Figure 2, the larger or smaller pilot water system being directed either through the last portion of the condenser such as in Figures 1 and 2, or through an auxiliary coil in the hot vapor inlet 10, such as in Figure 3.

While I have shown and described a preferred form of my invention and a schematic apparatus by which it may be practiced, it should be understood that many alterations, modifications and changes can easily and conveniently be made without departing from the fundamental theme. For example, the drawings fully depict only a surface condenser and the various modifications thereof and it should be fully understood that my invention can be practiced on what is known as a direct condenser, as the principle involved is fundamentally the same, and the ensuing claims should be interpreted to encompass both types or styles of condensers. In addition, the structure of Figure 5 has been shown with what I have termed the major pilot recirculatory system; however, it should be understood the auxiliary steam valve and controller of Figure 5 can easily be used with the smaller pilot system shown in Figure 2. Additionally, the structure of both Figures 4 and 5 can be used with the auxiliary coil structure designated 58 in Figure 3, instead of recirculating the pilot water through the last portion or the last few tubes or the final pass in the condenser. With these and many other numerous and obvious changes in mind, it should be understood that my invention has been shown in only a diagrammatic fashion, and the illustrations, as well as the above description, should not be interpreted to restrict my invention except as by the appended claims.

I claim:

1. A heat exchanger system adapted to be connected to a process having operative and inoperative periods, comprising a heat exchanger with a hot vapor inlet adapted to be connected to the process and a vapor outlet, said heat exchanger having a liquid inlet for cold water and an outlet for hot water, the system being provided with a liquid control valve to regulate the flow of water between the inlet and outlet, said valve being controlled by a controller which is responsive to the temperature of the liquid at the liquid outlet, and means for recirculating a constant pilot quantity of hot water produced by the system back through the hot vapors entering the heat exchanger and through the liquid outlet, said means being constructed to recirculate a constant pilot quantity both during the operative and inoperative periods of the process and to introduce said constant pilot quantity into the heat exchanger at a point no earlier than the last part of the regular liquid path, so that the liquid at the liquid outlet will remain at an elevated temperature at all times.

2. The structure of claim 1 in which the liquid control valve is located in the cold water inlet.

3. The structure of claim 1 in which the liquid control valve is located in the hot water outlet.

4. The structure of claim 1 characterized by and including a storage tank, said recirculation means being connected to the storage tank.

5. The structure of claim 1 in which said recirculation means is connected to the hot water outlet after the point of connection of a controller.

6. The structure of claim 1 in which the constant pilot quantity is recirculated through an auxiliary heat exchanger in the hot vapor inlet which is connected to the hot water outlet.

7. The structure of claim 1 in which the constant pilot quantity is recirculated through only the last portion of the regular liquid path in the heat exchanger.

8. A method of controlling the operation of an intermittent condenser system which has its liquid flow regulated in relation to the temperature of the liquid at the liquid outlet and is connected to a process having operative and inoperative periods, comprising the steps of recirculating a constant pilot quantity of hot liquid produced by the system back through the liquid outlet by introducing said quantity into the condenser at a point no earlier than the last part of the regular liquid path while subjecting said quantity to the hot vapors entering the condenser, said steps being performed both during the operative and inoperative periods of the process, so that the liquid at the liquid outlet will remain at an elevated temperature at all times.

9. The method of claim 8 characterized by and including the step of controlling liquid flow through the condenser at its cold water inlet.

10. The method of claim 8 characterized by and including the step of controlling the liquid flow through the condenser at its hot water outlet.

11. The method of claim 8 in which the condenser is connected to a storage tank, and including the step of withdrawing the constant pilot quantity of hot liquid from the storage tank.

12. The method of claim 8 characterized by and including the step of withdrawing the constant pilot quantity of the hot water outlet at a point adjacent but after the liquid outlet control point.

13. The method of claim 8 characterized by and including the step of recirculating the constant pilot quantity through the hot vapor inlet, and then supplying it to the hot water outlet of the condenser.

14. The method of claim 8 characterized by and including the step of introducing the constant pilot quantity of hot liquid into the last portion of the regular liquid path in the heat exchanger.

References Cited in the file of this patent

UNITED STATES PATENTS

| 1,009,820 | Alberger | Nov. 28, 1911 |
| 1,485,897 | West et al. | Mar. 4, 1924 |
| 1,706,719 | Ware | Mar. 26, 1929 |
| 1,723,637 | Williams | Aug. 6, 1929 |
| 2,104,333 | Rosenblad | Jan. 4, 1938 |

FOREIGN PATENTS

| 125,063 | Switzerland | Apr. 2, 1928 |